(12) United States Patent
Hoinka et al.

(10) Patent No.: US 11,691,571 B2
(45) Date of Patent: Jul. 4, 2023

(54) REMOVABLE MOUNTING ARRANGEMENT OF A ROOF RAIL ON THE ROOF OF A MOTOR VEHICLE

(71) Applicant: WKW Engineering GmbH, Wuppertal (DE)

(72) Inventors: Michael Hoinka, Heiligenhaus (DE); Andreas Wacker, Solingen (DE)

(73) Assignee: WKW Engineering GmbH, Wuppertal (DE)

( * ) Notice: Subject to any disclaimer, the term of this patent is extended or adjusted under 35 U.S.C. 154(b) by 0 days.

(21) Appl. No.: 17/289,380

(22) PCT Filed: Sep. 27, 2019

(86) PCT No.: PCT/EP2019/076185
§ 371 (c)(1),
(2) Date: Nov. 3, 2021

(87) PCT Pub. No.: WO2021/058109
PCT Pub. Date: Apr. 1, 2021

(65) Prior Publication Data
US 2022/0212606 A1   Jul. 7, 2022

(51) Int. Cl.
*B60R 9/058* (2006.01)
*B60R 9/052* (2006.01)
*B60R 9/045* (2006.01)
*B60R 11/00* (2006.01)

(52) U.S. Cl.
CPC .............. *B60R 9/058* (2013.01); *B60R 9/052* (2013.01); *B60R 9/045* (2013.01); *B60R 2011/0052* (2013.01)

(58) Field of Classification Search
CPC .......... B60R 9/058; B60R 9/045; B60R 9/052
See application file for complete search history.

(56) References Cited

U.S. PATENT DOCUMENTS

| 10,017,123 | B2 | 7/2018 | Binder et al. |
| 10,556,548 | B1* | 2/2020 | Keck, II ................... B60R 9/052 |
| 10,807,540 | B1* | 10/2020 | Neag ....................... B60R 9/058 |

(Continued)

FOREIGN PATENT DOCUMENTS

| DE | 202014102150 U1 | 5/2014 |
| DE | 10-2006-032006 | 8/2015 |

(Continued)

OTHER PUBLICATIONS

International Search Report & Written Opinion, dated Apr. 22, 2020, 11 pages.

*Primary Examiner* — Brian D Nash
(74) *Attorney, Agent, or Firm* — Gunther Evanina; Butzel Long

(57) ABSTRACT

The invention relates to a removable mounting arrangement of a roof rail 10 on the roof 20 of a motor vehicle. The rail profile 11 has a mounting wall 41 aligned an angle and recesses 42 for a mounting element 50 for introducing from the side. An adapter connected to the roof 20 of the motor vehicle also has an angled contact surface 31 having recesses 32 for the mounting elements 50. The potential for introducing the mounting elements 50 from the side enables easily mounting even a decorative roof rail 10 (FIG. 3).

18 Claims, 5 Drawing Sheets

(56) References Cited

U.S. PATENT DOCUMENTS

| | | | |
|---|---|---|---|
| 2016/0039355 A1* | 2/2016 | Settelmayer | B60R 9/10 |
| | | | 224/324 |
| 2018/0118127 A1* | 5/2018 | Wymore | B60R 9/04 |
| 2020/0039442 A1 | 2/2020 | Hawkins et al. | |
| 2020/0231095 A1 | 7/2020 | Chervu | |
| 2020/0386007 A1* | 12/2020 | Lane-Lohse | E04H 15/34 |
| 2022/0396214 A1* | 12/2022 | Kim | B60R 9/058 |

FOREIGN PATENT DOCUMENTS

| | | |
|---|---|---|
| EP | 0645281 B1 | 7/1994 |
| EP | 0952037 A2 | 10/1999 |
| GB | 2386591 A | 9/2003 |
| KR | 1020060042717 A | 5/2006 |
| WO | WO9511144 A1 | 4/1995 |
| WO | WO2020/218756 | 10/2020 |

\* cited by examiner

REMOVABLE MOUNTING ARRANGEMENT OF A ROOF RAIL ON THE ROOF OF A MOTOR VEHICLE

CROSS-REFERENCE TO RELATED APPLICATIONS

This application claims priority to PCT Application No. PCT/EP2019/076185, filed on Sep. 27, 2019 which is incorporated herein by reference in its entirety.

FIELD OF THE DISCLOSURE

The disclosure relates to a removable mounting arrangement of a roof rail on the roof of a motor vehicle, the roof rail being attached to the roof at at least two connecting points.

BACKGROUND OF THE DISCLOSURE

It is known to install a roof rail on roofs of motor vehicles at the two longitudinal edges of the vehicle roof. Such a roof rail is typically made of a bar extending over the entire length having a constant cross section, and separate feet or adapters for mounting the roof rail on the vehicle roof at the ends thereof. Two-footed roof rails, three-footed roof rails, and multiple-foot roof rails are known, the bar running spaced apart from the vehicle roof when the roof rail is mounted on the vehicle roof. Such a bar can also be achieved for a roof rail made as a single part of a bar and feet at the ends thereof, as shown in the document WO 95/11144 A1, namely made of an extruded profile. Furthermore, in addition to an elevated roof rail, a roof rail mounted flush on the vehicle roof is also used, as described in the document DE 202014102150 U1, wherein the bar and the feet are made of an extruded profile, wherein the feet at the ends thereof are produced by bending.

In order to mount a known roof rail on the roof of the motor vehicle, various mounting methods are known, for example connecting elements such as connecting screws passing through openings in the roof are disposed on the rail profile or on an adapter connected to the rail profile. Such or similar designs require that the rail be attached from the interior of the vehicle, so that installing and potentially removing can be performed in practice only at specialized repair shops.

Furthermore, designs are known for subsequently mounting a roof rail on the roof of a motor vehicle. For such subsequent mounting, studs are disposed on the roof of the motor vehicle, for example. In this case, as in the document DE 20200601836 U1, installing can be done from above. To this end, the roof rail profile comprises a receiving space open from above for covering with a suitable cap after mounting. Such caps differ in material and thus in appearance from the rest of the rail, producing an undesirable, non-uniform overall appearance.

SUMMARY OF THE DISCLOSURE

In certain aspects, the disclosed mounting arrangement provides an improved design enabling simple mounting, even for a decorative roof rail. Said mounting arrangement of a roof rail on the roof of a motor vehicle comprises both a flush-mounted roof rail and a two-footed or multiple-footed roof rail, a connection being made for each type of roof rail by means of at least two connecting points, namely at least one connection each to the front and the rear ends of the roof rail. One or more further connecting points can optionally be provided in the region between the two ends of the roof rail.

The roof rail itself is made of a railing profile of an aluminum material, preferably an extruded profile. The roof rail comprises a mounting part for each connecting point. Said mounting part can be a separate component or an integral part of the railing profile. In any case, said mounting part comprises an angled mounting wall having recesses for mounting elements, preferably connecting bolts. An adapter is further present for connecting said roof rail to the roof of the motor vehicle. Said adapter is or shall be connected to the roof. The adapter can be connected to the mounting part of the roof rail and comprises an angled contact surface having recesses for the mounting elements. Said contact surface is parallel to the angled mounting wall of the mounting part of the rail profile. The angled contact surface of the adapter preferably faces upward and the mounting wall of the mounting part faces downward at one side of the roof rail, such as the outer side, so that installing can be done easily from said side. To this end, an opening is provided on said side of the roof rail, so that the mounting elements can be introduced from the outside, through the opening, into the mounting wall of the mounting part. For mounting the roof rail on the roof, the roof rail having the mounting part is placed on the adapter mounted on the roof, wherein the corresponding mounting wall of the mounting part slides on the associated angled contact surface of an adapter until reaching the mounting position. In the mounting position, the mounting wall of the mounting part is then supported on the contact surface of the adapter and the mounting elements, such as connecting bolts, can be passed through the aligned recesses of the mounting wall and the angled contact surface for connecting, preferably in a bolted connection. Other mounting elements are also conceivable.

In a further embodiment, the side mounting is performed from the outer side of the roof rail, said side facing toward the center of the vehicle when installed. In this case, the mounting part comprises a mounting wall running at an angle downward to said outer side and the matching angled contact surface of the adapter then faces upward at an angle to the other outer side of the roof rail.

In a preferred embodiment, the adapter mounted on the roof additionally has two supporting feet holding the angled contact surface at the two longitudinal ends thereof, wherein the supporting feet are connected to the roof of the motor vehicle. Said embodiment of an adapter is preferably a sheet metal component. Further embodiments of an adapter are produced by means of pressure die-casting or injection molding. An adapter can be made both of metal and of a plastic.

Tolerance compensation is advantageously provided by means of the adapter. For height compensation (Z-direction), a blocking element is disposed on the adapter and blocks the lowering, sliding motion of the mounting wall of the mounting part on the contact surface when the mounting position has been reached. Such a blocking element can be formed easily for a sheet metal component by bending over the bottom edge of the contact surface. Such a bend, for example a tab, can also extend only over a partial length of the bottom edge of the contact surface. A short partial length is sufficient and has the further advantage that, if a corresponding recess is provided in the bottom edge of the mounting wall, such that the tab engages in said recess in the mounting position, a compensation in the Y-direction is thereby provided. The tab being supported in the recess on the mounting part without clearance provides compensation in the longitudinal direction of the rail profile, that is, in the X direction. Additional compensation can be provided in the X-direction if two recesses for the mounting elements are disposed on the adapter, wherein all recesses on all adapters are implemented as elongated holes except for one recess on one adapter. The one recess is implemented as a locating hole.

When the roof rail is connected to the roof at the connecting points provided, the openings at the roof rail enabling access to the mounting parts are closed off by means of a cover. The cover is connected to the roof rail by means of a form-fit or force-fit connection. The cover can be adapted to the shape and size of the opening and retained by means of a clip connection at the edge of the opening. The manner of connecting the cover to the roof rail also depends on where the opening is present on the roof rail. If the opening is directly at the rail profile, then corresponding grooves can be provided on the extruded rail profile, in order to retain the top and bottom edge of such a cover in said grooves and optionally also to displace the cover correspondingly along said grooves for a mounting procedure in order to expose or close off the opening. The opening can also be present at a separate housing for receiving the separate mounting part, particularly for a two-footed or multiple-footed roof rail, and for covering the receiving area for such a mounting part from the outside. It is known that such a housing can be an extruded profile, a sheet metal component, or a plastic part. A housing is preferably made of an aluminum material.

A cover is produced from the same material as the housing or the rail profile, for example, and has the same surface and same color as the housing or the rail profile on which the cover is mounted. The cover can, however, also be a design element and have a different surface and/or a different color. The cover can furthermore have a logo and/or lettering. It is also possible to provide a reflective surface for the cover. If a transparent material is used for the cover, then the light of an additional lighting element disposed in the housing or in the rail profile can also shine outward at this point.

According to an advantageous embodiment, the adapter is permanently connected to the roof of the motor vehicle at each connecting point provided, for example by means of a welded or bolted connection. This can be a connection in the roof channel of a roof of the motor vehicle, but also on the vehicle roof or on the side frame of the vehicle. The adapter can particularly be preinstalled on the motor vehicle and optionally covered by a bead or a strip and a roof rail is mounted on the roof if needed.

The novel mounting arrangement for a roof rail on the roof is implemented such that the roof rail can also be mounted on the roof of a motor vehicle subsequently, and can be removed from the roof again if a removable connection, such as a bolted connection, is used. A simple design leading to improved mounting is thereby provided. Mounting from the side of the roof rail is namely possible. Particularly advantageous mounting arrangements can also provide tolerance compensation in all three spatial directions.

Furthermore, embodiments and advantages of the disclosed arrangement are found in the description, subclaims, and drawing below. The invention is shown in embodiment examples in the drawing.

DETAILED DESCRIPTION

Figure 1:
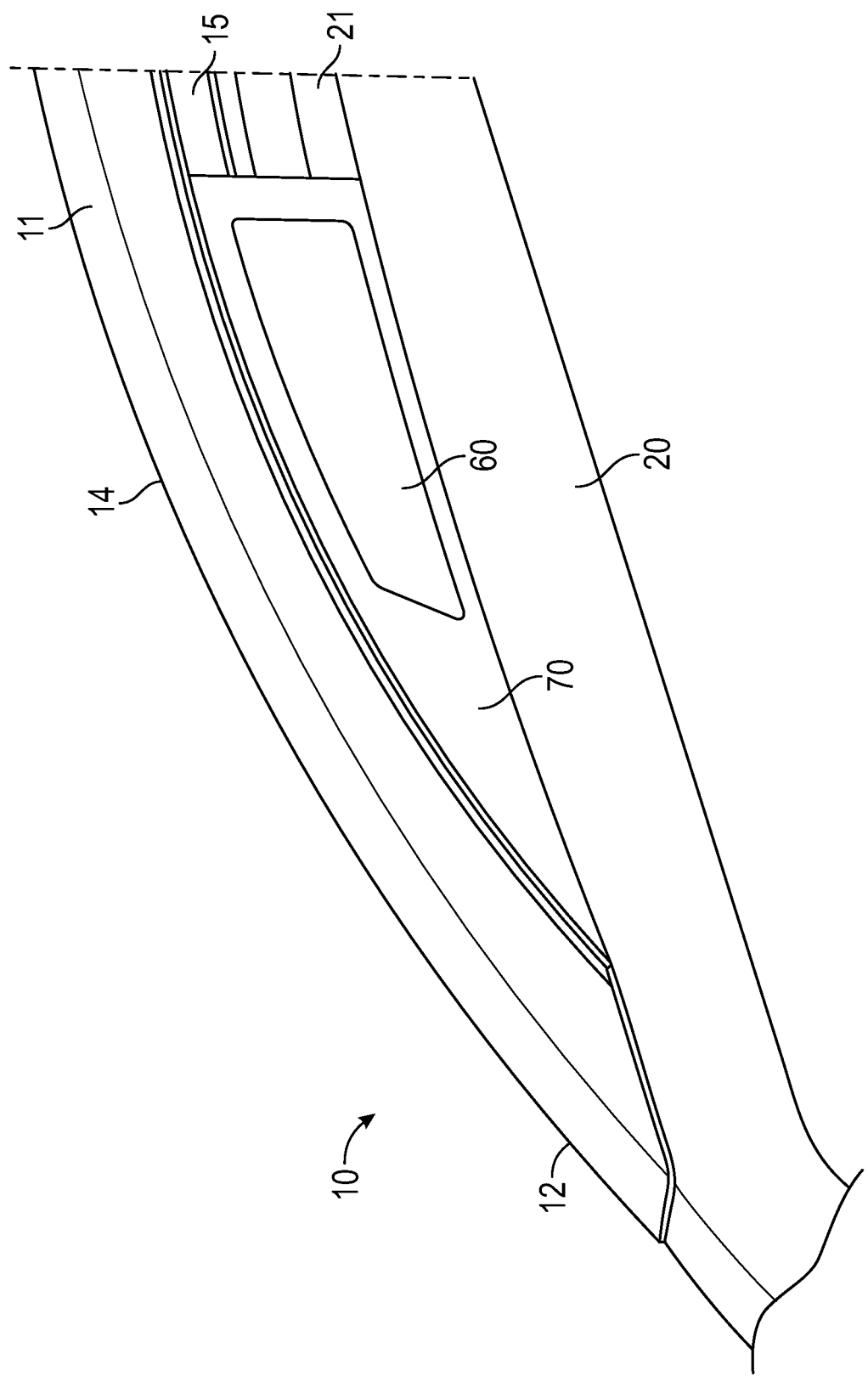
FIG. 1 is a part of a mounting arrangement according to the invention in the mounting position on the roof.
Figure 3:
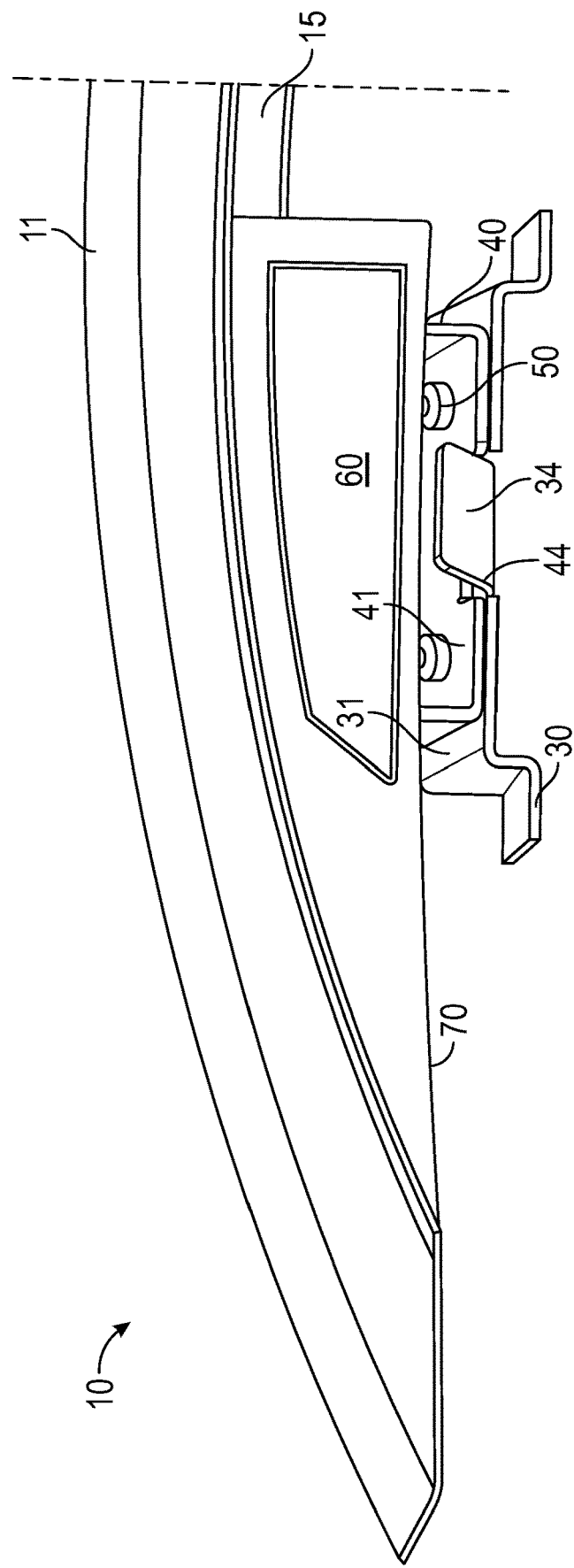
FIG. 3 shows the assembled mounting arrangement without a roof.

FIG. 1 shows a part of a first mounting arrangement of a multi-footed roof rail 10 mounted on the roof 20 of the motor vehicle. In the present case, the roof rail 10 is fixed in the region of the roof channel 21, that is, the mounting part 40 mounted on the roof rail 10 and connected to the adapter 30, protrudes past the bottom side of the roof rail 10, as shown in FIG. 3, and engages in the roof channel 21 where the adapter 30 is fixed. FIG. 1 shows a view of the outer side 15 of the roof rail 10. The roof rail 10 is installed or removed from the outer side 15. Such mounting from the side substantially facilitates the mounting of the roof rail 10. The roof rail 10 shown here comprises an extruded aluminum profile as a rail profile 11 curved at the ends 12 of the rail. A separate mounting part 40 is attached to the rail profile 11 in said curved region. As can be seen in FIG. 1, the mounting part 40 is covered toward the outside by a housing 70. Access to the mounting part 40 is provided via an opening 16, said opening being closed by a cover 60 after mounting.

Figure 2:
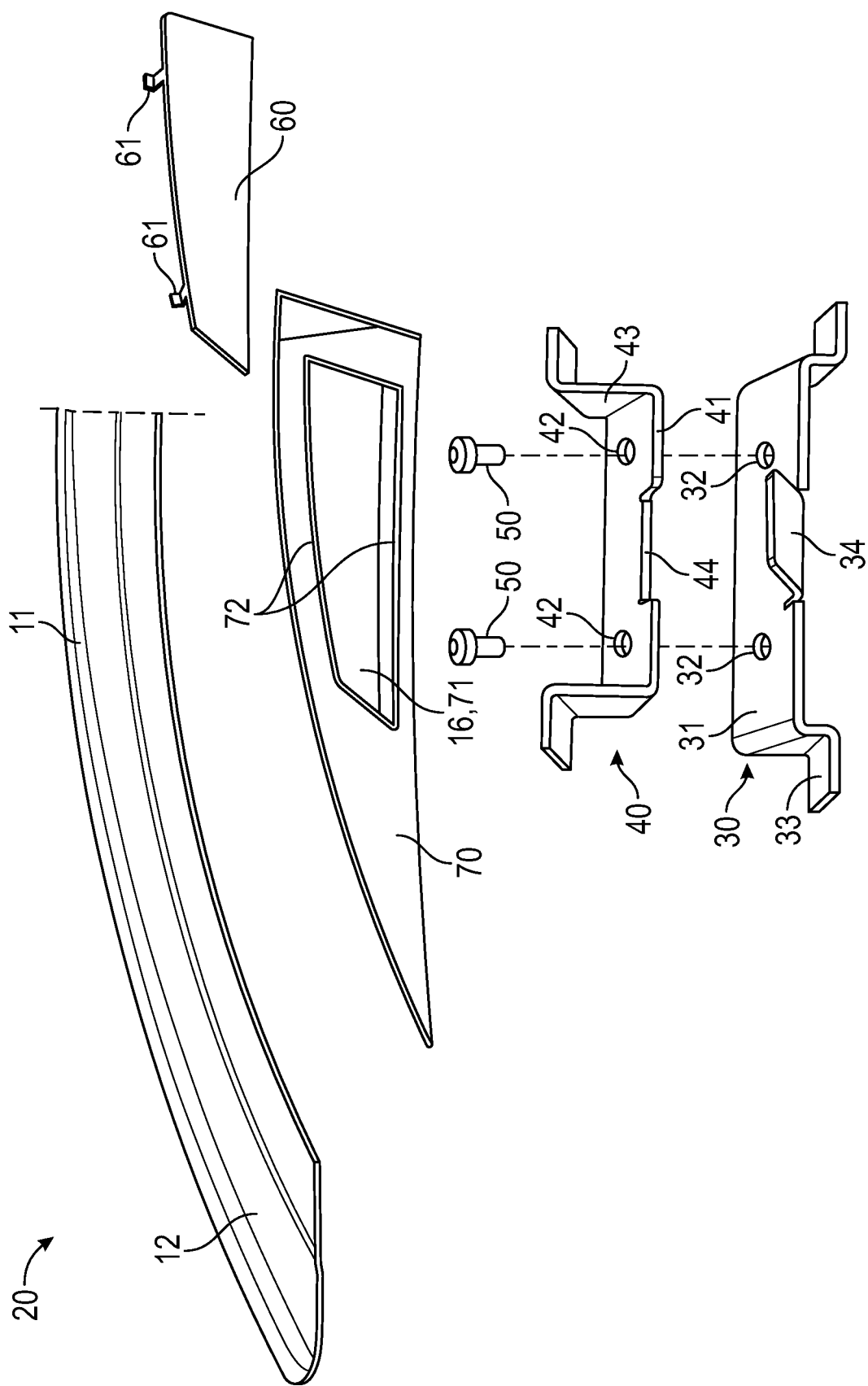
FIG. 2 shows the individual components of the mounting arrangement from FIG. 1.

The individual components can be seen in FIG. 2. FIG. 2 shows the rail profile 11 again, in the present case without the mounting part 40 and housing 70. In the region of the curved end 12 of the rail profile 11, the separate mounting part 40 is connected to the rail profile 11. To this end, the mounting part 40 comprises mounting feet 43 having curved ends. The curves at the ends can be fixed by means of a bolted connection at the rail profile 11, for example, or welded to the rail profile 11. When the mounting part 40 is attached to the rail profile 11, the angled mounting wall 41 faces downward toward the outer side 15, as can be best seen in FIG. 3. When the rail profile 11 is placed on the adapter 30 mounted on the roof 20, the mounting wall 41 slides downward along the angled contact surface 31 of the adapter 30 and, in the present embodiment example, easily reaches the mounting position, as a blocking part 34 in the form of a bent tab is provided on the adapter 30 and stops the downward sliding motion of the mounting part 40. The two recesses 42 of the mounting part 40 together with the two recesses 32 of the adapter 30 each form a common through hole for the mounting elements 50. Said tab 34 further engages in a recess 44 at the bottom edge of the mounting part 40, whereby the roof rail 11 is also positioned in the longitudinal direction. The blocking part 34 causes the mounting part 40 and thus the roof rail 10 is retained at a specified distance from the roof 20 in the mounting position. The adapters 30 provided for mounting the roof rail 10 on the roof 20 are mounted on the roof prior to installation, for example by means of bolted connections or welded connections. In this case, support feet 33 are provided, the bent ends thereof being mounted to the roof. The height of the support feet 33 for such an adapter 30 can be selected depending on the height of the roof channel 21. In an advantageous embodiment, such adapters 30 can already be mounted on the motor vehicle and the roof channel 21 having the adapters 30 can be covered by a roof strip or a bead, so that each motor vehicle of the same series provides the option for subsequently installing a roof rail 10 when purchased.

In the preferred embodiment, the recesses 42 of the mounting wall 41 are additional recessed in wells, bringing about additional tolerance compensation.

Figure 4:
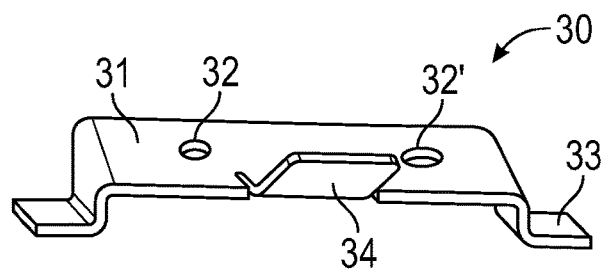
FIG. 4 shows a further embodiment of an adapter.

FIG. 4 shows a further embodiment of an adapter mounted on the roof 20 of the motor vehicle. A recess 32 is implemented here as a location hole and the recess 32' as an elongated hole. If such an adapter is disposed at the first connection point on the roof channel, for example, and all further adapters 30 are provided only with elongated holes as recesses 32', then said measure can be used for providing tolerance compensation in the longitudinal direction (X-direction).

Such a roof rail 10 is connected to the mounting part 40 as a preassembled unit. In the present case, the mounting part 40 is covered by a housing 70, so that said mounting part is completely covered on the outer side 14 thereof facing away from the center of the vehicle. From the opposite outer side 15 of the roof rail 10, the mounting part 40 is visible only if the opening 16 is not closed off by the cover 60. The opening 16 at the roof rail 10 is an opening 71 in the housing 70 in the embodiment example from FIG. 2. If the roof rail 10 is placed on a prepared roof 20 where the adapters 30 are mounted, and if the mounting walls 41 slide along the contact surfaces 31 into the mounting position thereof, then it is possible to introduce mounting elements 50, in the present case connecting bolts, through the opening 16 and into the stacked recesses 42, 32 for producing a connection. The opening 71 in the housing 70 is then covered by the cover 60. The cover 60 in the present case is retained on the housing 70 by means of a clipped connection. The cover 60 comprises two hooks, not shown, at the bottom edge on the back side thereof. The cover 60 is inserted in the opening 16, 71 by means of said hooks. The cover 60 further comprises two hooks 61 in the region of the top edge on the back side thereof for engaging behind the top edge of the opening 16, 71. The opening 71 on the housing 70, that is, the opening 16 on the roof rail 10, is then closed off and the roof rail is mounted on the roof. FIG. 3 shows a part of the roof rail 10 without a roof in order to make the assembled components 30, 40, 50 visible.

Figure 5:
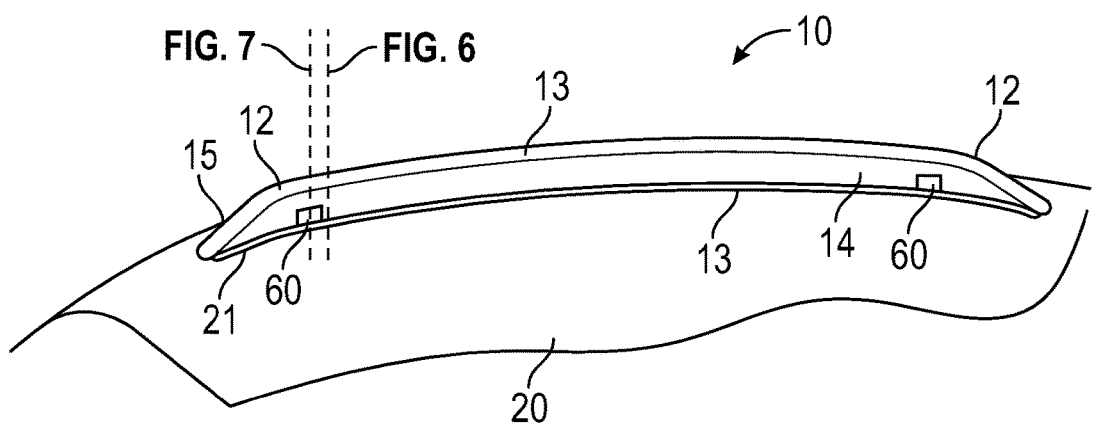
FIG. 5 shows a flush-mounted roof rail mounted on the roof.

FIG. 5 shows a further mounting arrangement. Identical reference numerals have been selected here for comparable components. The roof rail 10 in FIG. 5 is a flush-mounted roof rail 10 and is made of an extruded aluminum profile. Said roof rail 10 is mounted in a roof channel 21 of the roof 20. In this case, the mounting occurred from the outer side 14 of the roof rail, facing toward the center of the vehicle roof after installation. This is shown in FIG. 5, and the covers 60 are visible on the side 14 at each of the front and rear ends 12 of the rail profile 11. Said roof rail 10 is connected to the roof 20 at two connecting points.

Figure 6:
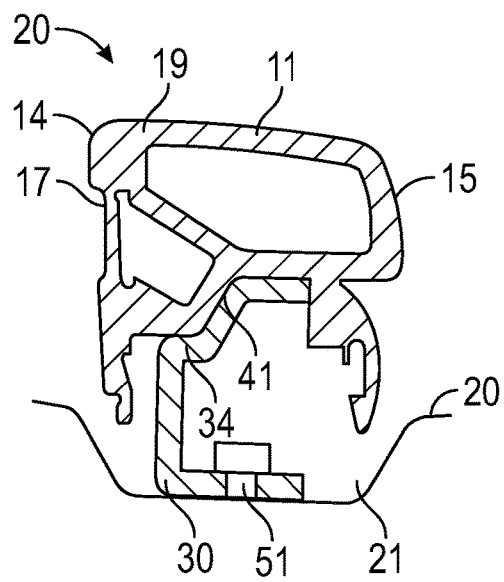
FIG. 6 is a cross-section through FIG. 5.
Figure 7:
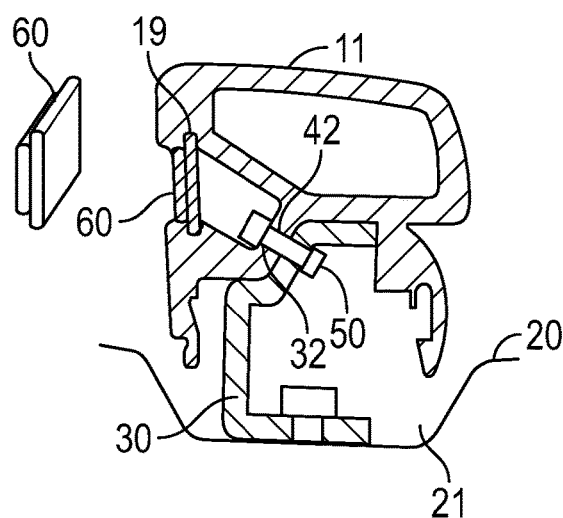
FIG. 7 is a further cross-section through FIG. 5.

FIG. 6 shows a cross-section through the flush-mounted roof rail 10 adjacent to the connecting point. It is evident that the rail profile 11 is a multi-chambered profile. A hollow chamber is closed off by the side wall 17. In the region of said side wall 17 is the opening 16 for obtaining access to the angled mounting wall 41, as can be seen in FIG. 7. Behind said side wall 17 is the angled mounting wall 41, part of the rail profile 11 in the present case. The mounting part 40 is thus an integral part of the rail profile 11. In the present case as well, an adapter 30, already mounted on the roof channel 21 by means of mounting means 51 is used for mounting the flush-mounted roof rail 10 on the roof 20. Said adapter 30 comprises an angled contact surface 31, facing upward in the present case, but facing toward the outer side 15 facing toward the outer side of the vehicle. In the present mounting arrangement, installing is done from the outer side 14 of the roof rail 10. No tab is shown on the adapter 30. The blocking element 34 for stopping the sliding motion of the mounting wall 41 along the contact surface 31 is formed here by a platform surface on which the bottom side of the rail profile 11 extending from the bottom edge of the mounting wall 41 rests in the mounted position.

As can be seen in FIG. 7, in the present case as well, an opening 16 is present for accessing a mounting element 50 to the mounting wall 41, in order to thus connect the rail profile 11 to the adapter 30. Said opening 16 is in the side wall 17, said wall being substantially thinner than the other walls of the rail profile 11. It is preferable that the side wall 17 is provided with ribbing in order to facilitate treating the surface after introducing the opening 16. A mounting element 50 is introduced through the opening 16 for mounting. Both the mounting wall 41 and the contact surface 31 comprise corresponding recesses 32, 42 for the mounting element 50, in the present case a connecting bolt. After the mounting element 50 has been screwed in, the opening 16 is closed off by means of a cover 60. Said cover 60 is a sliding element guided in the grooves 19 for opening or closing the opening 16 in the present example, and the top and bottom edge thereof engage in C-shaped grooves 19.

In a further embodiment, the thin side wall 17 from FIG. 6 can be separated out along the entire length of the rail profile 11 and a bead-like cover 60 can be retained in the C-shaped groove 19 over the entire length thereof.

Figure 8:
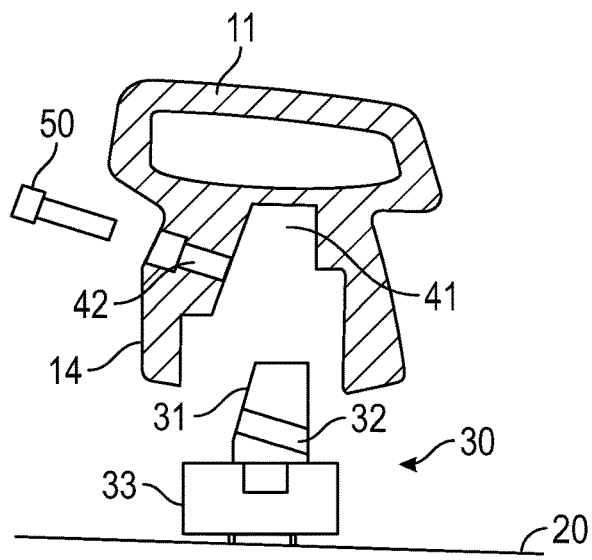
FIG. 8 shows the individual components of a further mounting arrangement.
Figure 9:
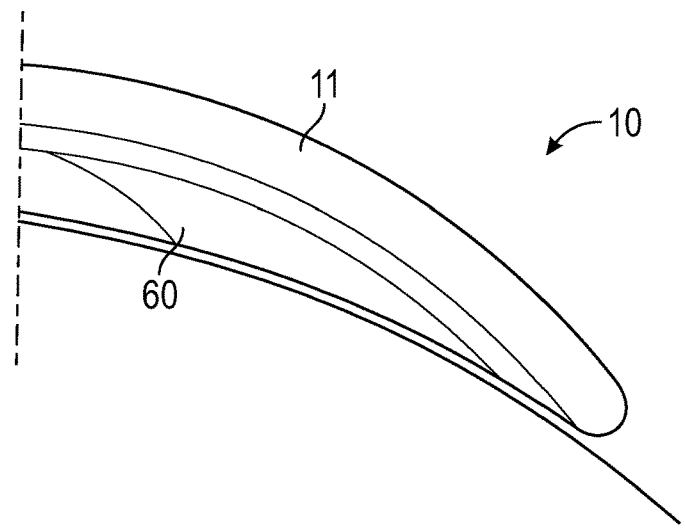
FIG. 9 shows the foot region of the roof region from FIG. 10.
Figure 10:
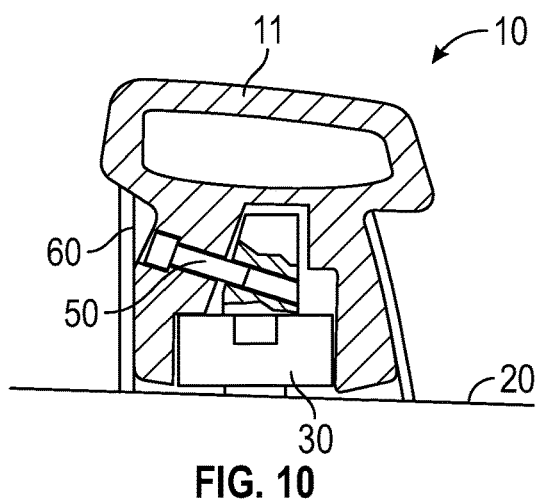
FIG. 10 shows the assembled mounting arrangement on the roof.

FIG. 8 shows a further mounting arrangement. Identical reference numerals have been selected here for comparable components. The roof rail 10 in FIG. 5 is a flush-mounted roof rail 10 and is made of an extruded aluminum profile. Said roof rail 10 is mounted on the roof 20 by means of an adapter 30. In the present case, the adapter 30 is an aluminum pressure die casting engaging into a hollow chamber having an angled wall through the bottom side of the rail profile 11 from below. Said angled wall is the mounting wall 41 for contacting the angled contact surface 31 of the adapter 30 in case of mounting, see FIG. 10. The adapter 30 can also be a composite component. As can be seen in FIG. 10, in the present case as well, an opening 16 is present for accessing a mounting element 50 to the mounting wall 41, in order to thus connect the rail profile 11 to the adapter 30. Opening 16 alone can be covered, or, as shown in FIG. 9, a cover 60 can be disposed in the foot region and cover the openings 16. Said covers 60 can be disposed both on the outer side 14 and on the outer side 15.

For all embodiments of the mounting arrangement shown, the mounting wall 41 and the contact surface 31 are provided at an angle of approximately 45 degrees from the roof surface. Side installation, namely introducing the mounting elements, is thereby facilitated.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

REFERENCE LIST

10 Roof rail
11 Rail profile
12 Rail end, foot region
13 Middle foot region
14 Outer side
15 Outer side
16 Opening
17 Side wall
18 Ribbing
19 C-groove
20 Roof
21 Roof channel
30 Adapter
31 Contact surface
32 32' Recess
33 Support foot
34 Blocking element
40 Mounting part
41 Mounting wall
42 Recess
43 Mounting foot
44 Recess
50 Mounting element
51 Connection point
60 Cover
61 Hook
70 Housing
71 Opening
72 Clip edges

What is claimed is:

1. A removable mounting arrangement of a roof rail on the roof of motor vehicle, the roof rail being attached to the roof at at least two connecting points;
   the roof rail having a rail profile made of an aluminum material and a mounting part for each connecting point;
   the mounting part comprising a mounting wall having recesses for mounting elements on the rail profile;
   one adapter being present for each connecting point and connected to the roof of the motor vehicle;
   the adapter being removably connectable to the mounting part of the roof rail,
   wherein the mounting wall on the mounting part is aligned at an angle in the transverse direction of the rail profile;
   the mounting wall is accessible through an opening at the outer side of the roof rail;
   the adapter comprises an angled contact surface having recesses for the mounting elements and the contact surface is parallel to the mounting wall in the mounting position;
   the mounting wall of the mounting part rests on the angled contact surface of the adapter, the mounting elements extend through the opposing recesses of the mounting wall and contact surface; and
   the mounting elements connect the mounting part to the adapter in the mounting position.

2. The mounting arrangement according to claim 1, wherein the mounting part is an integral part of the rail profile.

3. The mounting arrangement according to claim 1, wherein the mounting part is a separate element having one mounting foot at each of the front and rear ends of the mounting wall in the longitudinal direction for connecting to the rail profile.

4. The mounting arrangement according to claim 3, wherein the mounting part is a sheet metal part or a pressure die-casting part or an injection molded part or a composite component made of metal or plastic.

5. The mounting arrangement according to claim 1, wherein the adapter is a sheet metal part and has one supporting foot each for connecting to the roof at the front and rear ends of the contact surface in the longitudinal direction.

6. The mounting arrangement according to claim 5, wherein the adapter is a sheet metal part or a pressure die-casting part or an injection molded part or a composite component made of metal or plastic.

7. The mounting arrangement according to claim 1, further comprising a blocking element at the bottom edge of the contact surface of the adapter for stopping the sliding motion of the mounting part on the angled contact surface when installing.

8. The mounting arrangement according to claim 7, wherein the blocking element of the adapter has the form of a bent tab extending over only part of the length of the contact surface, and the mounting part has a recess for the tab at the bottom edge thereof, so that the mounting part is fixed in the specified mounting position on the adapter when installing.

9. The mounting arrangement according that claim 1, wherein the mounting wall and the contact surface are at an angle of approximately 45° to the roof in the mounting position.

10. The mounting arrangement according claim 1, wherein the contact surface has a first, recess implemented as a location hole and a second recess is implemented as an elongated hole for compensating for tolerances in the longitudinal direction.

11. The mounting arrangement according to claim 10, wherein the mounting wall is recessed into the recesses.

12. The mounting arrangement according claim 1, wherein the opening provided on outer side of the roof rail is implemented on the rail profile or on a rail foot or on a housing covering the foot region of the roof rail.

13. The mounting arrangement according to claim 12, wherein the mounting wall bounds a hollow channel of the rail profile and said hollow channel is closed off to the outer side of the roof rail by a side wall, wherein the opening provided on the rail profile is first produced when regions of said side wall are separated out at the desired connecting points.

14. The mounting arrangement according to claim 13, wherein the side wall is thinner than the other walls of the rail profile and comprises ribbing on the outer side thereof.

15. The mounting arrangement according to claim 1, wherein the opening can be closed off by means of a cover, wherein the cover is retained by means of a form-fit and/or force-fit connection on the roof rail.

16. The mounting arrangement according to claim 15, wherein C-shaped grooves retaining retain the cover in a sliding manner are provided on the rail profile in the longitudinal direction of the profile.

17. The mounting arrangement according to claim 1, wherein a cover is a design element having a desired color, having a desired surface, or optionally having lettering or a logo.

18. The mounting arrangement according to claim 17, wherein the cover has a reflecting surface or is transparent.

* * * * *

UNITED STATES PATENT AND TRADEMARK OFFICE
CERTIFICATE OF CORRECTION

PATENT NO. : 11,691,571 B2
APPLICATION NO. : 17/289380
DATED : July 4, 2023
INVENTOR(S) : Michael Hoinka and Andreas Wacker It is certified that error appears in the above-identified patent and that said Letters Patent is hereby corrected as shown below:

In the Claims

Claim 9, Line 1, delete "that" and insert --to.--.

Claim 10, Line 1, after "according" insert --to--.

Claim 10, Line 2, delete the "," between first and recess.

Claim 12, Line 1, after "according" insert --to--.

Claim 16, Line 2, delete "retaining.".

Signed and Sealed this
Twenty-fifth Day of June, 2024

Katherine Kelly Vidal
*Director of the United States Patent and Trademark Office*